(12) United States Patent
Hayashi

(10) Patent No.: US 7,233,420 B2
(45) Date of Patent: Jun. 19, 2007

(54) MIRROR ATTACHMENT STRUCTURE FOR IMAGE-READING APPARATUS

(75) Inventor: Eiichi Hayashi, Saitama (JP)

(73) Assignee: Fujinon Corporation, Saitama (JP)

( * ) Notice: Subject to any disclaimer, the term of this patent is extended or adjusted under 35 U.S.C. 154(b) by 1005 days.

(21) Appl. No.: 10/367,922

(22) Filed: Feb. 19, 2003

(65) Prior Publication Data

US 2003/0184825 A1      Oct. 2, 2003

(30) Foreign Application Priority Data

Mar. 29, 2002    (JP)    ............... 2002-096760

(51) Int. Cl.
*H04N 1/04* (2006.01)
(52) U.S. Cl. .............. 358/497; 358/474; 358/482; 358/483
(58) Field of Classification Search ........ 358/497, 358/494, 474, 487, 471, 483, 482, 475, 505, 358/506, 509, 512–514; 399/211; 250/208.1, 250/216, 239, 234–236
See application file for complete search history.

(56) References Cited

U.S. PATENT DOCUMENTS 5,754,314 A * 5/1998 Araki et al. ............... 358/487

5,973,796 A * 10/1999 Schissler et al. ............ 358/474
7,133,164 B2 * 11/2006 Chen et al. ................. 358/474
2002/0034410 A1    3/2002 Bartolome et al.

FOREIGN PATENT DOCUMENTS

JP         10-42103        2/1998

OTHER PUBLICATIONS

Machine translation into English attached.

* cited by examiner

*Primary Examiner*—Cheukfan Lee
(74) *Attorney, Agent, or Firm*—Arnold International; Bruce Y. Arnold

(57) ABSTRACT

A mirror attachment structure for an image-reading apparatus that includes a carriage for mounting a light source for illuminating a document and a photoelectric conversion device for receiving light from the document includes a reinforcement sheet metal member. The reinforcement sheet metal member includes first and second sections that do not lie in the same plane and a mirror that is fixed to one of the sections. The carriage supports the reinforcement sheet metal member. The reinforcement sheet metal member may be formed into a proper shape by bending. The mirror may be directly bonded to the reinforcement sheet metal member, mounted on a support attached to the reinforcement sheet metal member, or formed directly on the reinforcement sheet metal member by evaporating aluminum onto the reinforcement sheet metal member.

22 Claims, 8 Drawing Sheets

MIRROR ATTACHMENT STRUCTURE FOR IMAGE-READING APPARATUS

BACKGROUND OF THE INVENTION

Some image readers (i.e., scanners) are made to move an optical unit that includes a light source, a photoelectric conversion device, and optical elements such as lenses and mirrors along a manuscript to form an optical path for guiding the reflected light from the manuscript to the photoelectric conversion device to obtain image data of the manuscript. The optical unit is integrated into a carriage, and a driving mechanism for moving the carriage, such as a driving or timing belt, is coupled with the carriage and is moved back and forth by rotation of a driving motor. A guide rod extends in the direction of the longer side of the carriage in order to guide the movement of the carriage.

The basic concept of attaching a mirror to a mount or carriage is disclosed in prior art patents, such as U.S. Pat. Nos. 3,918,806, 3,936,179 and 4,073,584.

Prior art FIGS. 7 and 8 show a traditional structure for attaching a mirror to an elongated carriage, with FIG. 7 being a vertical cross-sectional view and FIG. 8 being an exploded, oblique view. In the central section of the carriage 1, an elongated light source 2 is integrated in such a manner that the light source 2 illuminates a manuscript mounted on a platen glass 3 arranged above the carriage 1. The light from the light source 2 is condensed to a line above the upper surface.

An elongated strip-shaped, first mirror 4 is arranged in the vicinity of the light source 2 in order to receive light reflected from the manuscript. The first mirror 4 has a length that accepts light from the entire width of the manuscript. The light from the manuscript is incident onto the first mirror at angles which are substantially 45 degrees to the normal to the mirror 4 surface. Thus, the light after reflection from the mirror 4 travels substantially horizontally to a rod lens array 5 that is arranged at the front of the first mirror 4. The rod lens array 5 is formed of rod-shaped lenses arranged in parallel, wherein light rays reflected from the first mirror 4 enter a first end of the rod lenses, pass through the rod lenses, and exit after being appropriately converged.

An elongated second mirror 6 is provided at the second end of the rod lens array 5. The second mirror 6 is made in a strip shape and the reflection surface is inclined substantially 45 degrees to the horizontal so that the light rays traveling horizontally from the rod lens array 5 are reflected vertically downward. The photoelectric conversion device 7 is arranged underneath the second mirror 6. In the photoelectric conversion device, an appropriate number of photoelectric conversion units are arranged in parallel so that the reflected light rays from virtually the entire reflection surface of the second mirror 6 may be intercepted. The optical unit, including the light source 2, the first mirror 4, the rod lens array 5, the second mirror 6 and the photoelectric conversion device 7, is housed in a unit holder 1a formed in an appropriate recessed area in the carriage 1. The photoelectric conversion device 7 is integrated in a sensor substrate 8.

In appropriate locations in the carriage 1, elongated reinforcement sheet metal members 9a and 9b are attached to increase the rigidity of the carriage 1. Covers 1b and 1c are placed over the carriage 1 that houses the optical unit. On both sides of the carriage 1 are attached covers 1e, 1e which interlock with a guide rod (not shown) that is provided in the casing of the carriage 1 in order to guide the movement of the carriage 1. A recessed area 1d is formed, as shown in FIG. 7, at one end of the carriage 1 in order to provide passage for an electrical harness 10.

In the conventional mirror attachment structure described above, the following problems may occur because the strip-shaped mirrors 4 and 6 are made to be attached on mirror table components 4a and 6a formed inside the unit holder 1a of the carriage 1, as seen in FIG. 7. Because the mirrors 4 and 6 are very thin, they must be handled with care, and careless handling during installation may result in breakage. Mirrors 4 and 6 are attached to the mirror table components 4a and 6a, respectively, with two-sided adhesive tape. The two-sided adhesive tape is placed on the reverse side of the mirrors 4 and 6 at appropriate intervals, and is adhered to the mirror table components 4a and 6a. Empty spaces are formed between the back surface of the mirrors 4 and 6 and the mirror table components 4a and 6a where there is no two-sided adhesive tape applied. Carelessly pressing on these areas may result in breakage of the mirrors 4 and 6.

The mirrors 4 and 6 have a length that is longer than their width, which may prevent light rays from striking the mirrors unless they are adequately extended in a predetermined direction. In addition, because of the use of two-sided adhesive tape, the mirror is easily shifted in position. Peeling-off the adhesive tape to correct for the shift may also result in breakage of the mirrors 4 and 6.

After attachment, the mirrors 4 and 6 must be inspected to assure that the mirror is facing in the predetermined direction, but because the mirrors 4 and 6 are narrow, it is difficult to inspect the entire mirrors 4 and 6 prior to and during installation. This makes mass production difficult. Inspection is performed by obtaining chart image data that is available only after the product has been assembled. Discovery of defective products at this point results in a lower yield of acceptable products.

BRIEF SUMMARY OF THE INVENTION

The present invention relates to a mirror attachment structure on an elongated carriage that moves an optical unit along a manuscript in an image-reading apparatus (i.e., a scanner), wherein elongated mirrors are firmly secured to elongated reinforcement sheet metal members of the carriage.

To improve ease of the mirror assembly process and to improve the attachment precision of the mirror, the mirror is first interlocked with a reinforcement sheet metal member and is then assembled into a carriage containing an optical unit in an image-reading apparatus.

In order to improve the transportability and storability of an image-reading apparatus, the image-reading apparatus is preferably made thin. To make the image-reading apparatus thinner, the carriage must be made thinner. To make the carriage thinner, the optical unit must occupy less space. A rod lens array is used in which an appropriate number of rod lenses are provided in parallel in the middle of the optical path. This allows the mirror to have a narrower width, leading to space saving for the optical unit, which in turn enables a thinner carriage.

The present invention provides a mirror attachment structure for an image-reading apparatus that is easier to mass produce. Furthermore, breakage of the mirrors during installation is nearly eliminated, and the precision to which the mirrors may be reliably installed is increased.

In order to assemble the mirror into a carriage, the mirror is pre-attached and interlocked to a reinforcement sheet metal member. The mirror may be attached in a predetermined position and easily adjusted on the reinforcement sheet metal, making handling of the mirror easy during installation. Because the reinforcement sheet metal is mechanically attached onto and integrated with the carriage with screws, or the like, it may be attached in a predetermined position. This makes the attachment and positioning of the mirrors simple, improving the ease of mass production of the image-reading apparatus and reduces costs.

The attachment structure of the first embodiment of the present invention is more three-dimensional than that of the mirrors that have only a small thickness. The handling of the mirrors is simpler because the reinforcement sheet metal on which the mirrors are already attached is integrated with the carriage. The mirrors are precisely positioned in predetermined locations on the reinforcement sheet metal, enabling accurate and easy positioning of the mirrors in predetermined locations on the carriage.

In the attachment structure of the second embodiment of the present invention, the mirrors are first attached to the mirror support members, and then the mirror support members are attached to the reinforcement sheet metal. The attachment positions of the mirror support members on the reinforcement sheet metal may be easily adjusted. Thus, positions of the mirrors are easily adjusted and the mirrors are accurately attached to the predetermined locations on the carriage. In addition, the mirrors may be made in a simple strip shape, thereby leading to a cost reduction.

In the mirror attachment structure of the third embodiment, the reinforcement sheet metal members are bent. The reinforcement sheet metal may be bent easily to desired angles. The reflection angle of the mirrors may be easily adjusted to predetermined angles for attachment of the strip-shaped mirrors to the mirror support members. This enables easy establishment of the positional relationship between the mirror and the carriage. Because separate mirror support members are not needed, the number of components is reduced, leading to improvement in assembly of the mirror attachment. Because bending of the reinforcement sheet metal increases resistance to large bending moments, there is an improved rigidity of the carriage into which the reinforcement sheet metal is integrated.

Mirrors in the fourth embodiment may be formed directly onto the reinforcement sheet metal during processing of the reinforcement sheet metal, making assembly of the mirrors unnecessary while enabling formation of more precise reflection surfaces.

BRIEF DESCRIPTION OF THE DRAWINGS

The present invention will become more fully understood from the detailed description given below and the accompanying drawings, which are given by way of illustration only and thus are not limitative of the present invention, wherein.

DETAILED DESCRIPTION

Figure 1:
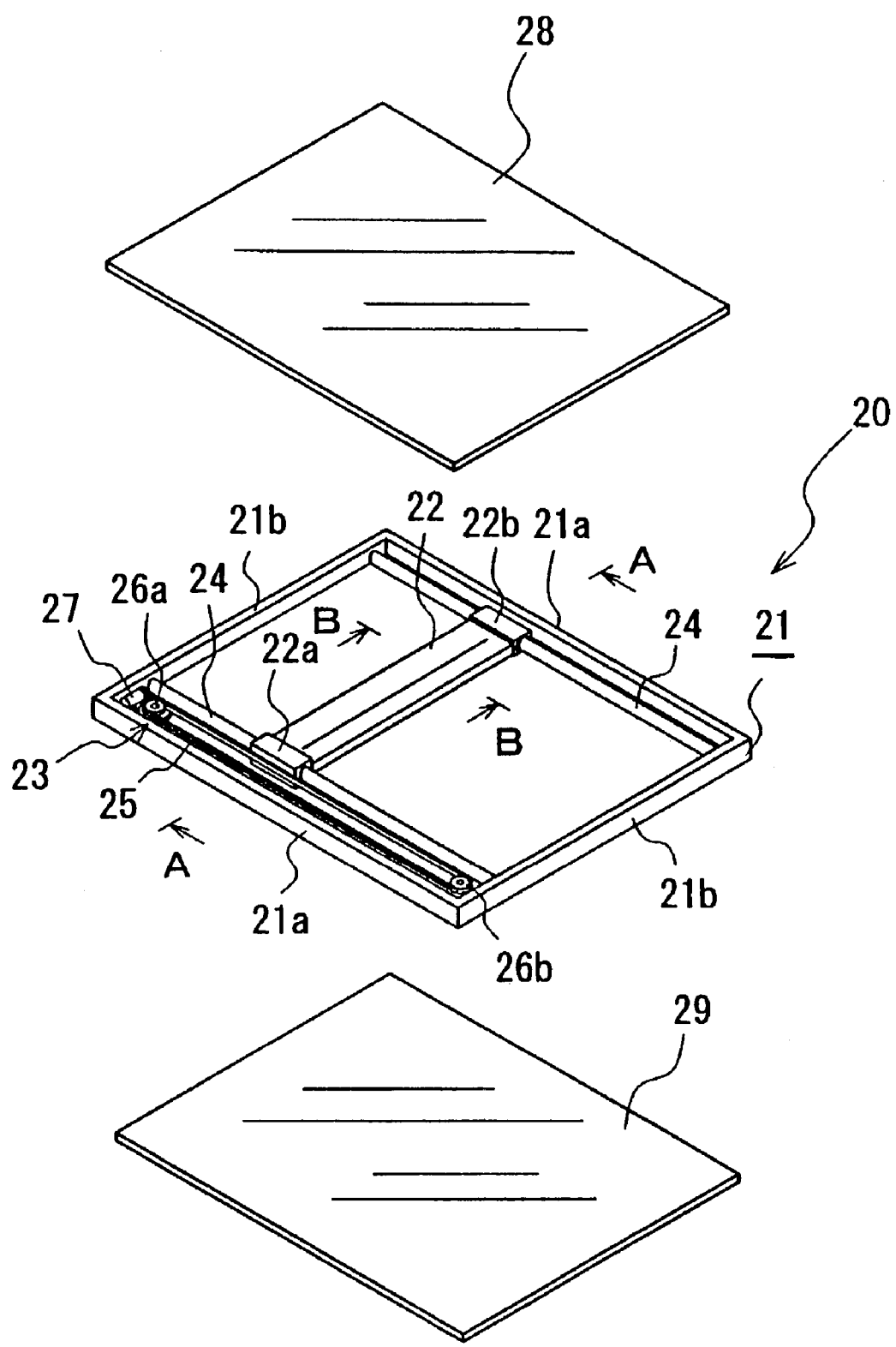
FIG. 1 shows an exploded oblique view illustrating a schematic of a scanner into which the apparatus of the present invention is integrated.
Figure 2:
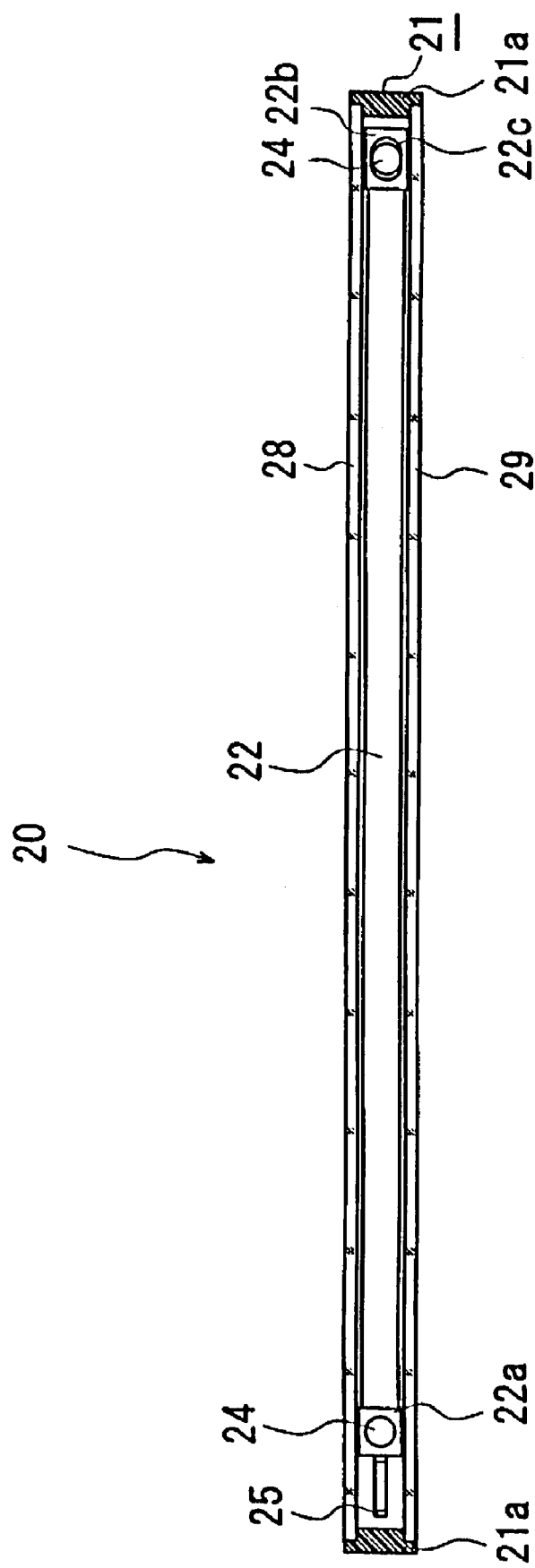
FIG. 2 shows a cross-sectional view along the section line A-A in FIG. 1 with the scanner assembled.

FIGS. 1 and 2 schematically illustrate the structure of a scanner 20 that is an image-reading apparatus having an elongated carriage on which an elongated mirror is attached using the attachment mechanism of the present invention. FIG. 1 is an exploded oblique view, and FIG. 2 is a cross-sectional view with respect to line A-A of FIG. 1, of the assembled scanner 20. FIG. 1 shows that the scanner 20 consists of a virtually rectangular casing or frame 21, with its size corresponding to the size of a manuscript, from which the image data is to be obtained, in which the carriage 22 and the driving mechanism 23, for moving the carriage 22, are housed. Sliding components 22a and 22b, in which guide holes are formed, are provided in the sides of the carriage 22. At the same time, guide rods 24, 24 are provided lengthwise along the casing 21, and the guide rods 24, 24 are made to pass through the guide holes of the sliding components 22a and 22b. FIG. 2 shows that the guide hole 22c is formed in the sliding component 22b with the guide rod 24 moving freely through the opening (to tolerate dimensional errors along the width) in the direction perpendicular to the direction of the movement of the carriage 22.

A driving belt 25 is provided between one of the guide rods 24 and the longer-side wall part 21a of the casing 21. The driving belt 25 runs between the driving-side pulley 26a and the driven-side pulley 26b that are supported near each shorter-side wall part 21b, 21b of the casing 21. The output rotation from the driving motor 27 is transmitted with appropriate speed variation to the driving-side pulley 26a, with a portion of the driving belt 25 being fixed on the sliding component 22a.

A platen glass 28 is attached on top of the casing 21, and the manuscript from which image data is to be read, is mounted on the platen glass 28. A bottom plate 29 is provided on the bottom part of the casing 21. Glass is used for the bottom plate 29 to assure enough rigidity for the casing 21, even if the thickness of the casing 21 is made smaller.

Figure 3:
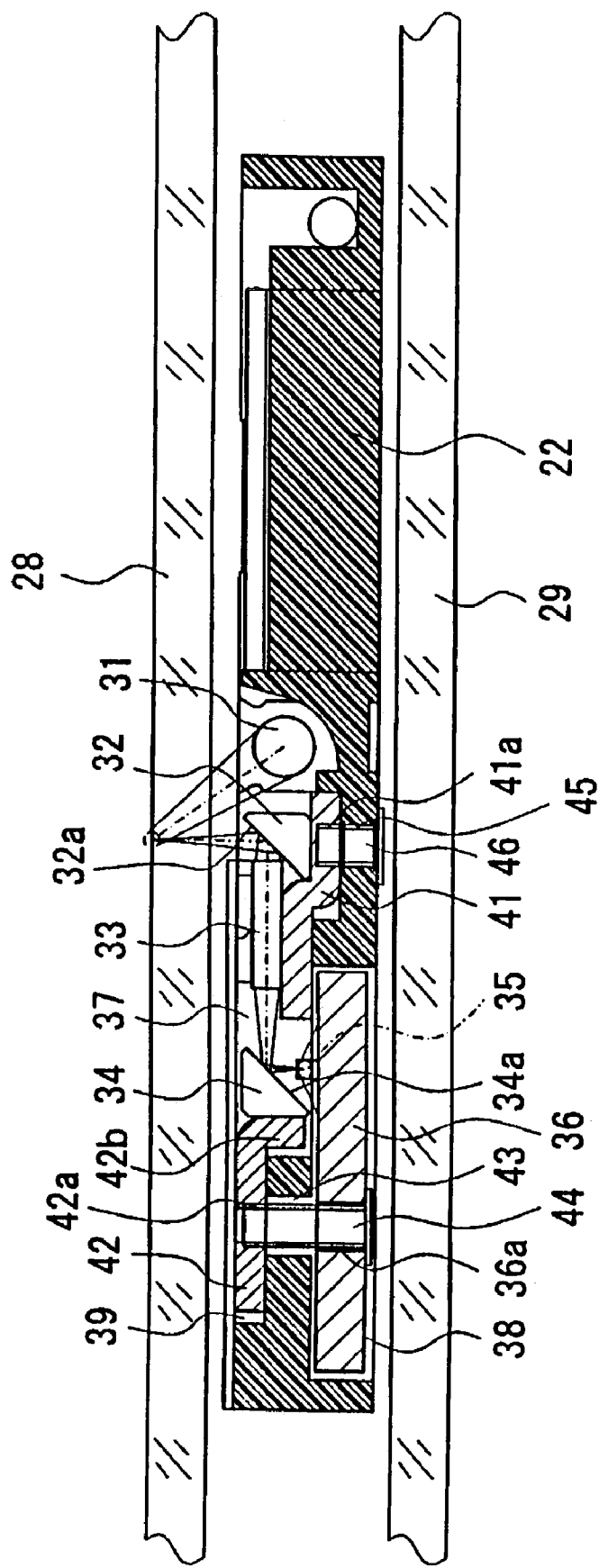
FIG. 3 shows a cross-sectional view of a mirror attachment structure according to a first embodiment of the present invention, taken along the line B-B in FIG. 1 with the scanner assembled.

FIG. 3 shows a cross-sectional view with respect to the section line B-B in FIG. 1 of a first embodiment of the mirror attachment structure of the image-reading apparatus of the present invention. The elongated carriage 22 is formed with an appropriate shape using plastic or a similar material. The optical unit includes a light source 31, an elongated first mirror 32, a rod lens array 33, an elongated second mirror 34, a photoelectric conversion device 35, and a sensor substrate 36 that are integrated into the carriage 22. The light source 31, the first mirror 32, the rod lens array 33, the second mirror 34, and the photoelectric conversion device 35 are housed in a unit holder area 37 that is formed as a recess of an appropriate shape in the top of the carriage. The sensor substrate 36 is housed in a recess on the bottom of the carriage 22 that connects with the recess on the top of the carriage 22. Thus, elongated reinforcement sheet metal members 41 and 42 are integrated into the carriage 22, along with the optical unit that includes light source 31 and a photoelectric conversion device 35 which are provided so as to obtain image data of the manuscript mounted on the platen glass 28. The elongated reinforcement sheet metal members 41 and 42 extend most of the length of the carriage 22 along its direction of elongation so as to increase the rigidity of the carriage 22 and so as to provide support for the elongated first mirror 32 and the elongated second mirror 34 that also extend most of the length of the carriage along its direction of elongation in order to scan as large an area as practical. The elongated first mirror 32 guides the reflected light rays from the manuscript to the rod lens array 33, and the elongated second mirror 34 guides the light rays exiting from the rod lens array 33 to the photoelectric conversion device 35.

In fact, preferably the first reinforcement sheet metal member 41 and the second reinforcement sheet metal member 42 have virtually the same length as the carriage 22 along the direction of elongation of the carriage 22. The first reinforcement sheet metal member 41 is housed at the bottom of the unit holder area 37, while the second reinforcement sheet metal member 42 is housed in a recessed area 39 formed adjacent the surface of the carriage 22. The first reinforcement sheet metal member 41 is anchored on the carriage 22 by tightening an anchor screw 46 passing through a hole 45 formed in the bottom surface of the carriage 22 and passing into the female screw area 41a which is formed in the first reinforcement sheet metal member 41. A hole 43 runs through the carriage 22 at the substrate recessed area 38 and into the recessed area 39. The second reinforcement sheet metal member 42 is anchored to the carriage 22 and the sensor substrate 36 by tightening the anchor screw 44 running through the hole 43 and the hole 36a formed in the sensor substrate 36, into a female screw area 42a formed in the second reinforcement sheet metal member 42.

The first reinforcement sheet metal member 41 is formed with its cross-section resembling a crank with its outer facing side bent downward and outward to form an upper first section and a lower second section. The second reinforcement sheet metal member 42 is formed with its cross-section resembling an L-shape by bending the inner facing side downward to form a first section and a smaller bent second section. The shorter side of the L-shaped part 42b is located in the unit holder area 37 in such a manner that the inward and downward extending shorter-leg of the L-shaped part 42b extends vertically.

Both the first mirror 32 and the second mirror 34 are formed by isosceles right triangle rods with reflection surfaces being provided on the slanted surfaces 32a and 34a, respectively. The lower surface of the first mirror 32 is affixed directly onto the first reinforcement sheet metal member 41 outer portion upper surface, while the outward-facing surface of the second mirror 34 is affixed directly onto the inward-facing surface of the shorter side of the L-shaped part 42b.

In the mirror attachment structure of the first embodiment, the first mirror 32 and the second mirror 34 are pre-affixed at predetermined positions onto the first reinforcement sheet metal member 41 and the second reinforcement sheet metal member 42, respectively, using two-sided adhesive tape or a bonding agent. Mirrors 32 and 34 are integrated into the carriage 22 simply by attaching the first reinforcement sheet metal with the first mirror 32 and the second reinforcement sheet metal with the second mirror 34 into their predetermined positions of the carriage 22.

In the mirror attachment structure of the first embodiment, the first reinforcement sheet metal member 41 and the second reinforcement sheet metal member 42 are attached to the carriage 22 with an anchoring screw 46 and an anchoring screw 44, respectively. The reinforcement sheet metal members 41 and 42 may be adjusted easily into a predetermined position on the carriage 22. Because the mirrors 32 and 34 are pre-attached onto the reinforcement sheet metal members 41 and 42, respectively, attachment to the predetermined positions becomes simple. As a result, mirrors 32 and 34 are easily attached to the carriage 22 at predetermined positions. Because the mirrors 32 and 34 are made of isosceles right-triangle rods, the surface normals of the mirrors 32 and 34 may be easily oriented at 45 degrees relative to the entering light rays.

The reflection surface is formed on one side of a triangular rod, and a surface of the rod other than the reflection surface is affixed to the reinforcement sheet metal. By forming the mirror on a surface of the triangular rod, handling of the mirror becomes much easier and makes the installation of the reflection surface onto a reinforcement sheet metal member much simpler.

Figure 4:
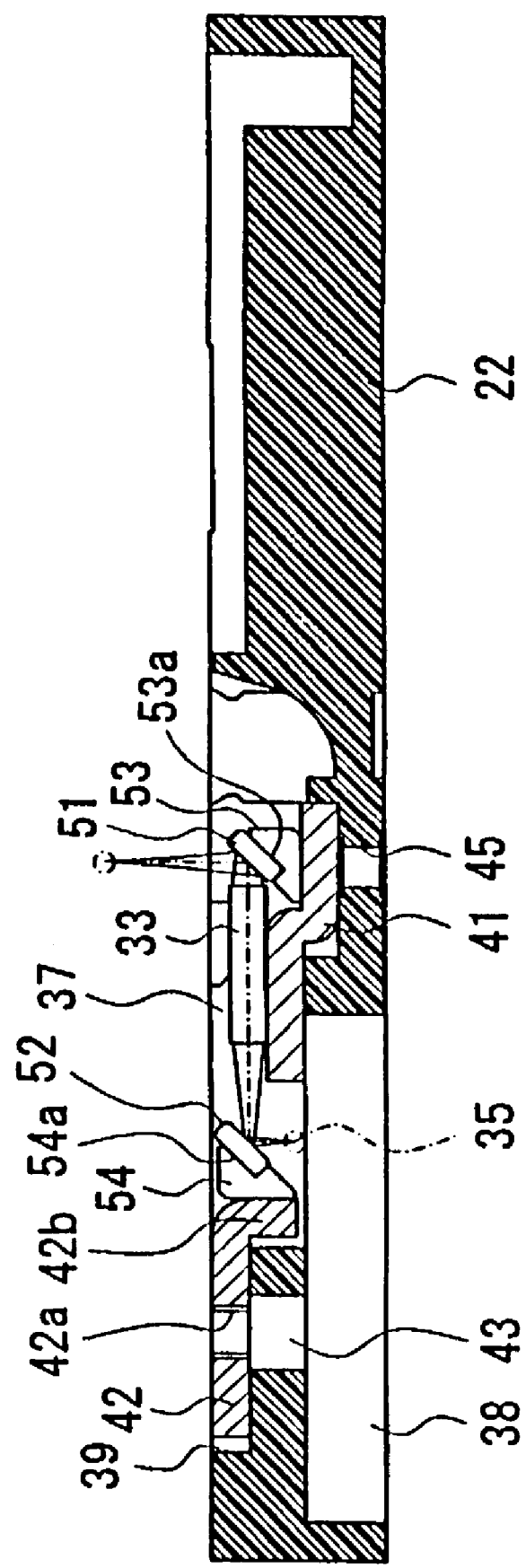
FIG. 4 shows a cross-sectional view of a mirror attachment structure according to a second embodiment of the present invention.

FIG. 4 shows a second embodiment of the mirror attachment structure of the image-reading apparatus of the present invention. In the figure, components that are identical to the same components in FIG. 3 are identified with the same symbol, with other components being omitted or separately identified. In the second embodiment, both a first mirror 51 and a second mirror 52 are formed in an elongated strip shape. The elongated mirrors 51 and 52 are attached to the elongated first reinforcement sheet metal member 41 and the elongated second reinforcement sheet metal member 42 using support brackets 53 and 54, respectively. In this instance, the mirrors 51 and 52 are affixed onto the elongated support brackets 53 and 54 using two-sided adhesive tape or a bonding agent. The support brackets 53 and 54 are secured directly to the reinforcement sheet metal members 41 and 42 using two-sided adhesive tape, a bonding agent or screws.

In the support brackets 53 and 54, mirror receiving components 53a and 54a are formed by cutting notches from the edge in the portion of the inclined surfaces of the isosceles right triangle rods. The mirrors 51 and 52 are fitted and affixed to the mirror receiving components 53a and 54a. The supporting brackets 53 and 54 are secured directly to the reinforcement sheet metal members 41 and 42. The support bracket 53 on which the first mirror 51 is attached is secured on the top surface of the first reinforcement sheet metal member 41, while the support bracket 54, on which the second mirror 52 is attached, is secured on the inward facing surface of the shorter side of the L-shaped part 42b.

In the mirror attachment structure of the second embodiment, the mirrors are formed in a strip shape. Because the shape is simple, processing of the mirrors is achieved quickly and the production cost is reasonable. Because the mirrors 51 and 52 are positioned and affixed onto the mirror receiving components 53a and 54a, the positioning of the mirrors 51 and 52 with the support brackets 53 and 54 is maintained constant. The positioning between the support brackets 53 and 54 and the reinforcement sheet metal members 41 and 42 may be easily adjusted. In addition, the attachment between the reinforcement sheet metal members 41 and 42 and the carriage 22 may be easily adjusted. Because the support brackets 53 and 54 are formed from isosceles right triangle rods, the surface normals of the reflection surfaces of the mirrors 51 and 52 are easily oriented at 45 degree angles relative to the entering light rays. Because the support bracket 53 and the support bracket 54 may be formed with identical shapes, part management is simplified.

Figure 5:
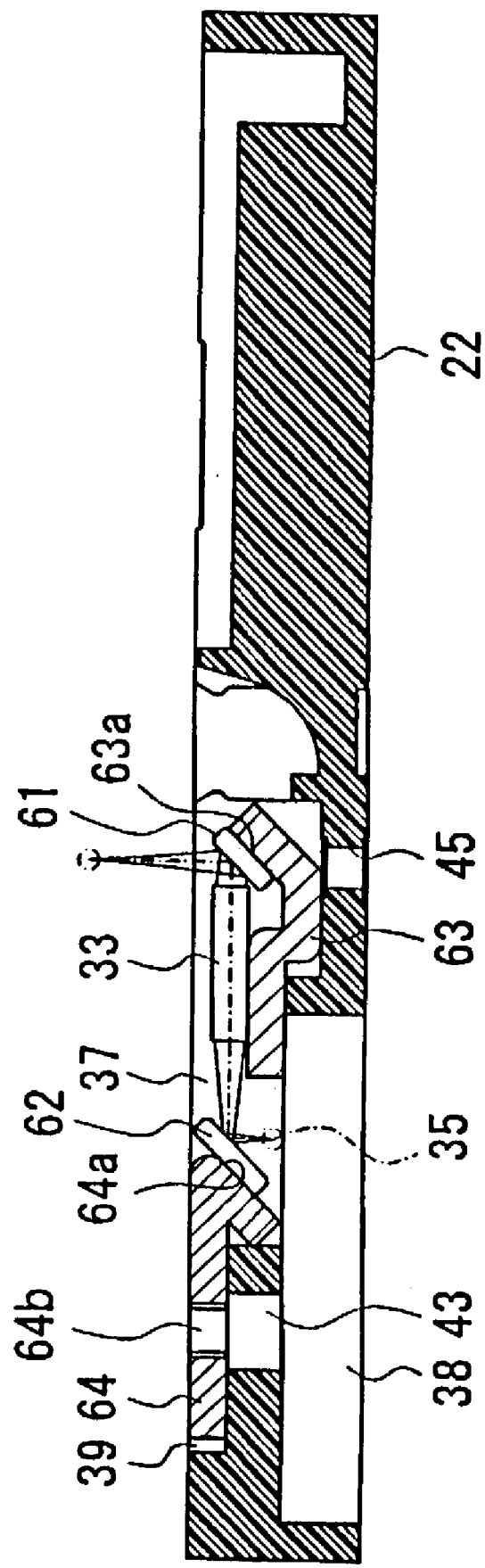
FIG. 5 shows a cross-sectional view of a mirror attachment structure according to a third embodiment of the present invention.

FIG. 5 shows a third embodiment of the mirror attachment structure of the image-reading apparatus of the present invention. In the figure, components that are identical to the components in FIG. 4 are identified with the same symbols with other components being omitted or separately identified. In the third embodiment, both the elongated first mirror 61 and the elongated second mirror 62 are formed in a strip shape. The first mirror 61 is attached to the elongated first reinforcement sheet metal member 63, and the second mirror 62 is attached to the elongated second reinforcement sheet metal member 64.

In the mirror attachment structure of FIG. 5, a mirror support is formed by bending portions of the reinforcement sheet metal. The reinforcement sheet metal may be strip-shaped, but if it is bent width-wise at the center to achieve an appropriate cross-sectional shape, a generally V-shape as shown in FIG. 5, rigidity is improved and the reinforcement sheet metal is desirably able to resist large bending moments. If the reinforcement sheet metal is bent, a portion of the reinforcement sheet metal surface may be made to point in an appropriate direction at an appropriate angle. With this configuration, the strip-shaped mirror may be attached to and supported by the reinforcement sheet metal.

The first reinforcement sheet metal member 63 is made by bending the strip-shaped sheet metal outer portion downward, then outward, and then such that the outer side edge tip end slants upward at a nearly 45 degree angle to the horizontal. The first mirror 61 is attached to the outer side edge tip end which forms a mirror support 63*a*. The second reinforcement sheet metal member 64 is made by bending one inner portion or edge of the strip-shaped sheet metal downward and backward nearly 135 degrees relative to the main reinforcement sheet metal, thereby forming a mirror support 64*a*. The second mirror 62 is attached to the mirror support 64*a*. In the second reinforcement sheet metal member 64, a female screw area 64*b* is formed that receives an anchor screw 44, as shown in FIG. 3.

In the mirror attachment structure of the third embodiment, the mirrors 61 and 62 are integrated in the carriage 22 by first affixing the mirrors 61 and 62 onto the respective mirror supports 63*a* and 64*a* with two-sided adhesive tape, a bonding agent, and the like, and by attaching the reinforcement sheet metal members 63 and 64 to predetermined positions on the carriage 22.

Because the first mirror 61 is attached to the mirror support 63*a* that is bent upward nearly 45 degrees and integrated in the carriage 22, the first mirror 61 is able to reflect light rays reflecting from the manuscript into a virtually horizontal direction. The reflected light rays enter the rod lens array 33. Because the second mirror 62 is attached to the mirror support 64*a* facing the lower area of the carriage at substantially 45 degrees, the light rays exiting the rod lens array 33 and incident onto the second mirror 62 from a horizontal direction are reflected vertically downward, entering the photoelectric conversion device 35.

Figure 6:
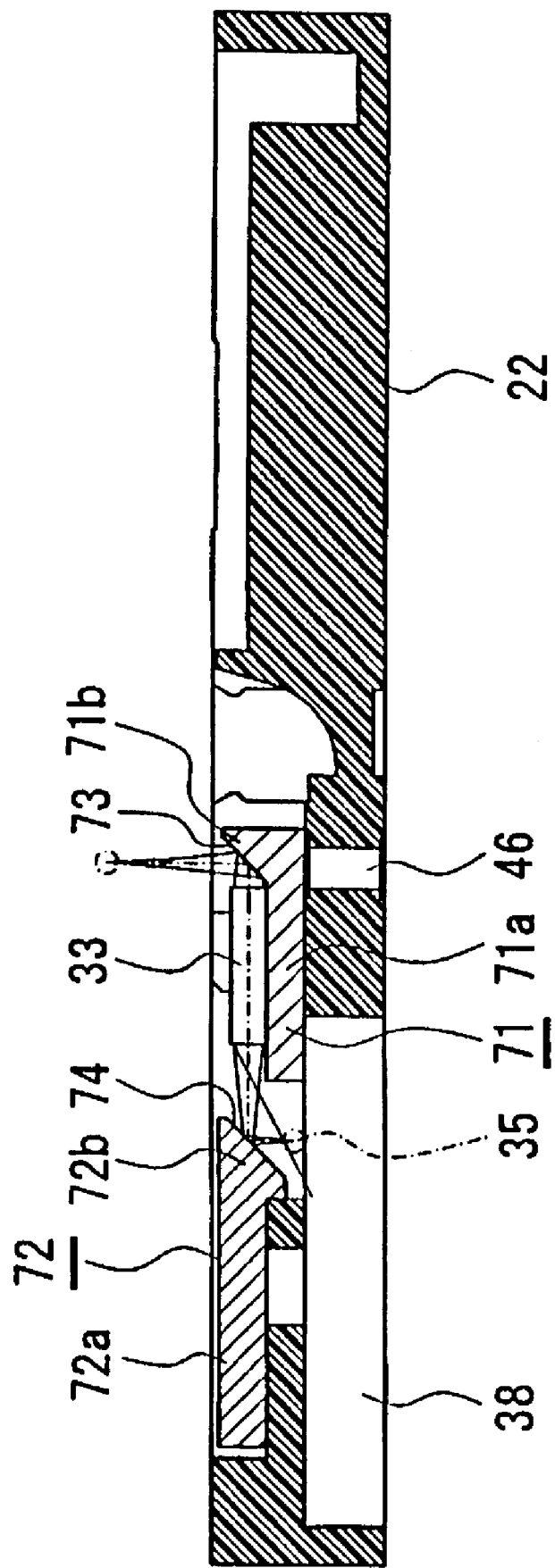
FIG. 6 shows a cross-sectional view of a mirror attachment structure according to a fourth embodiment of the present invention.
Figure 7:
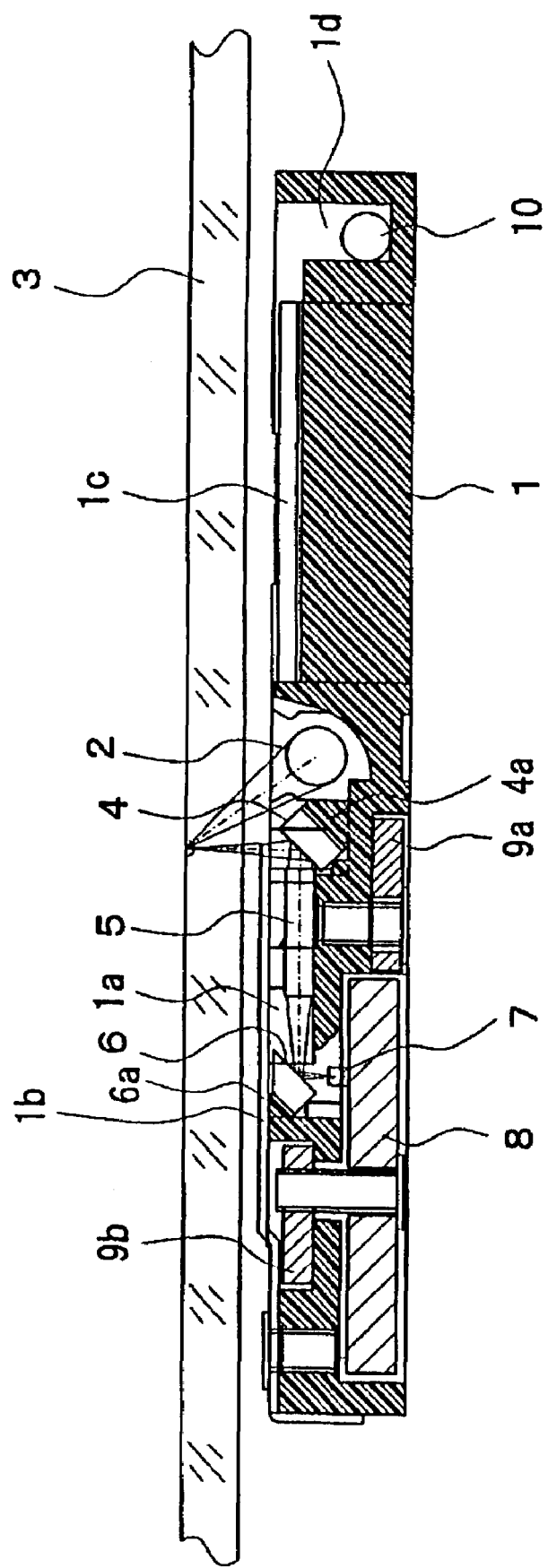
FIG. 7 shows a cross-sectional view illustrating a conventional prior art mirror attachment structure.
Figure 8:
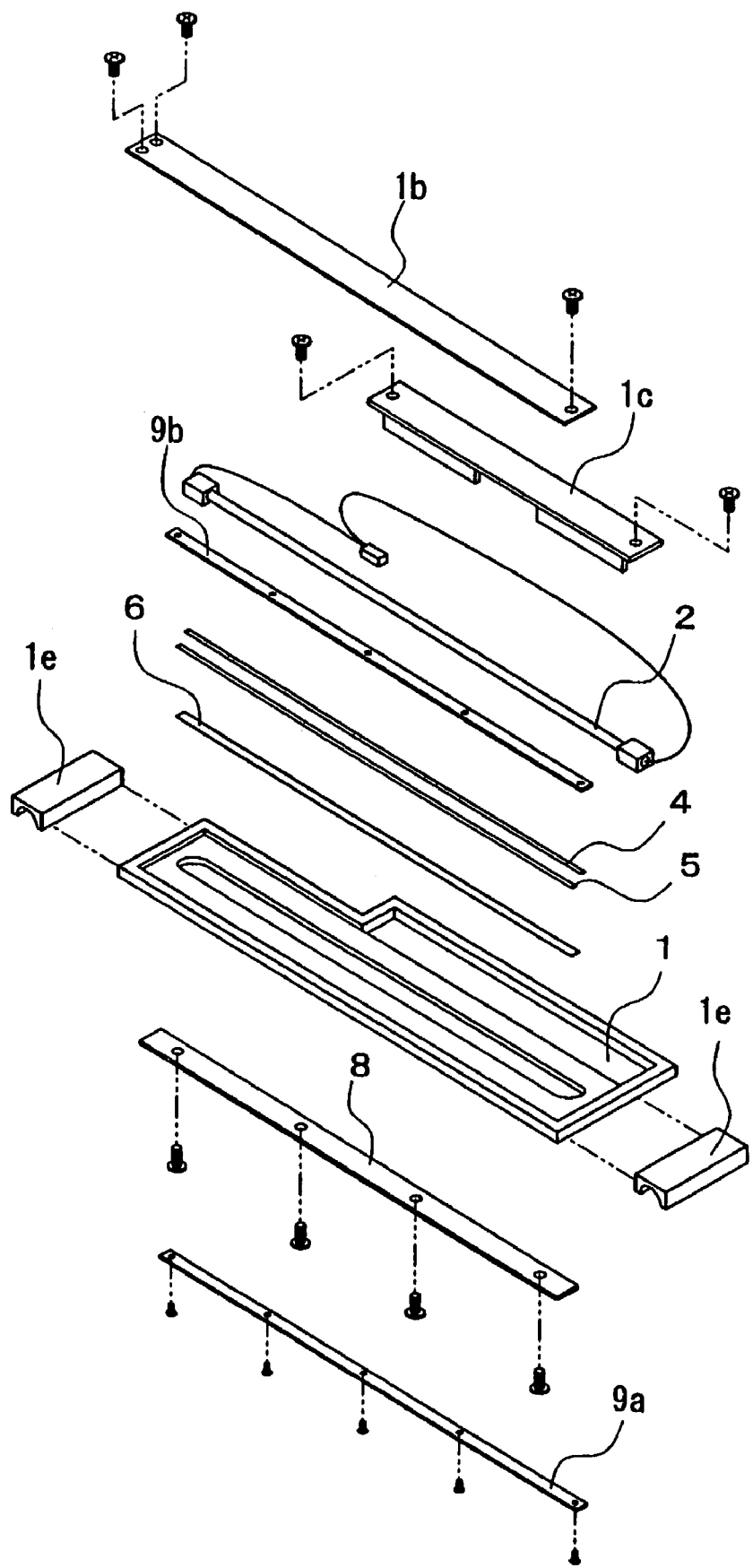
FIG. 8 shows an exploded oblique view of a prior art carriage with a conventional mirror attachment structure.

FIG. 6 shows a fourth embodiment of the mirror attachment structure of the image-reading apparatus of the present invention. In the figure, the components that are identical to the components in FIG. 3 are identified with the same symbols, with other components being omitted or separately identified. In the fourth embodiment, the elongated first mirror 73 and the elongated second mirror 74 are formed on a portion of the elongated first reinforcement sheet metal member 71 and the elongated second reinforcement sheet metal member 72, respectively.

The first reinforcement sheet metal member 71 is formed of the strip-shaped main part 71*a*, which is the first section, and the mirror part 71*b*, which is the second section. The main part upper surface is slanted up at a substantially 45 degree angle to the horizontal, with the slanted surface 71*b* being positioned on the upper face of the outer portion and facing inward toward the upper surface of the main part 71*a*. The first mirror is made directly on the slanted surface of the first reinforcement sheet metal member 71. The second reinforcement sheet metal member 72 is formed of the strip-shaped main part 72*a* and the mirror part 72*b* wherein one inner facing end part of the second reinforcement sheet metal member 72 is slanted downward and backward at a substantially 45 degree angle, with the slanted surface positioned on the inward facing lower side of the reinforcement sheet metal member 72 and facing away from the main part 72*a*. The second reinforcement sheet metal member 72, like the other sheet metal members disclosed above, includes a first section and a second section. However, the second section of second reinforcement sheet metal member 72 is comprised of only the downwardly protruding portion adjacent the second mirror that is made on the slanted surface of the second reinforcement sheet metal member 72. The first mirror 73 and the second mirror 74 are formed by high precision finishing of the surfaces of the mirror parts 71*b* and 72*b*, respectively.

In the mirror structure of the fourth embodiment, the first mirror 73 and the second mirror 74 are integrated into the carriage 22 by first attaching the reinforcement sheet metal members 71 and 72 into the carriage 22. The process of attaching the mirrors 73 and 74 to the carriage 22 is simplified, leading to improved assembly. The mirrors 73 and 74 may be produced during molding of the reinforcement sheet metal members 71 and 72, enabling accurate positioning of the mirrors 73 and 74. The mirrors 73 and 74 are positioned precisely in predetermined locations when integrated into the carriage 22.

In the fourth embodiment, the mirrors 73 and 74 are formed by mirror-finishing the surfaces of the reinforcement sheet metal members 71 and 72, but the mirrors 73 and 74 may be formed by evaporating aluminum onto the surfaces of the mirror parts 71*b* and 72*b*. As an alternative, aluminum may be evaporated over the entire surface of the reinforcement sheet metal members 71 and 72. The reinforcement sheet metal members 71 and 72 are thin and have a small width, hence evaporating aluminum onto the entire reinforcement sheet metal members 71 and 72 costs about the same and is easier than evaporating aluminum only onto portions of these members. The result is an improved manufacture and assembly operation.

The invention being thus described, it will be obvious that the same may be varied in many ways. Such variations are not to be regarded as a departure from the spirit and scope of the invention. Rather, the scope of the invention shall be defined as set forth in the following claims and their legal equivalents. All such modifications as would be obvious to one skilled in the art are intended to be included within the scope of the following claims.

What is claimed is:

1. A mirror attachment structure for an image-reading apparatus that includes a light source for illuminating a document and a photoelectric conversion device for receiving light from the light source reflected from the document that are mounted in the image-reading apparatus for movement together relative to the document in order to scan the document, the mirror attachment structure comprising:
- a carriage that is elongated in a first direction for supporting the light source and the photoelectric conversion device;
- a reinforcement sheet metal member that is secured to a portion of the carriage, that is elongated in said first direction, and that extends over most of the length of the carriage in said first direction; and
- a mirror that is secured to a portion of the reinforcement sheet metal members, with the reinforcement sheet metal member being between the mirror and the portion of the carriage that supports the reinforcement sheet metal member; wherein
- the reinforcement sheet metal member is secured to a portion of the carriage to increase the rigidity of the carriage;
- the mirror is elongated in said first direction and extends over most of the length of the reinforcement sheet metal member and most of the length of the carriage in said first direction; and
- the carriage is designed to support the light source, the photoelectric conversion device, and the mirror so that light from the light source that is reflected from the document and then from said mirror is reflected generally toward the photoelectric conversion device.

2. The mirror attachment structure of claim 1, wherein the reinforcement sheet metal member and the mirror occupy recesses in the carriage.

3. The mirror attachment structure of claim 2, wherein the carriage includes recesses for receiving the light source and the photoelectric conversion device.

4. The mirror attachment structure of claim 3, wherein the mirror is a one piece structure with a first side that includes a reflecting surface for reflecting light from the light source that is reflected from the document and a second side that is adhesively bonded to the reinforcement sheet metal member.

5. The mirror attachment structure of claim 3, wherein the mirror is mounted on a support that is attached to the reinforcement sheet metal member.

6. The mirror attachment structure of claim 3, wherein the mirror is mounted directly on the reinforcement sheet metal member and the surface of the reinforcement sheet metal member that supports the mirror is parallel to the reflecting surface of the mirror.

7. The mirror attachment structure of claim 2, wherein the mirror is a one piece structure with a first side that includes a reflecting surface for reflecting light from the light source that is reflected from the document and a second side that is adhesively bonded to the reinforcement sheet metal member.

8. The mirror attachment structure of claim 2, wherein the mirror is mounted on a support that is attached to the reinforcement sheet metal member.

9. The mirror attachment structure of claim 2, wherein the minor is mounted directly on the reinforcement sheet metal member and the surface of the reinforcement sheet metal member that supports the mirror is parallel to the reflecting surface of the mirror.

10. The mirror attachment structure of claim 9, wherein the portion of the reinforcement sheet metal member that includes said surface is formed by bending part of the reinforcement sheet metal member.

11. The mirror attachment structure of claim 2, wherein the mirror is formed by evaporating aluminum onto said portion of the reinforcement sheet metal member.

12. The mirror attachment structure of claim 1, wherein the mirror is a one piece structure with a first side that includes a reflecting surface for reflecting light from the light source that is reflected from the document and a second side that is adhesively bonded to the reinforcement sheet metal member.

13. The mirror attachment structure of claim 1, wherein the mirror is mounted on a support that is attached to the reinforcement sheet metal member.

14. The mirror attachment structure of claim 1, wherein the mirror is mounted directly on the reinforcement sheet metal member and the surface of the reinforcement sheet metal member that supports the mirror is parallel to the reflecting surface of the mirror.

15. The mirror attachment structure of claim 14, wherein the portion of the reinforcement sheet metal member that includes said surface is formed by bending part of the reinforcement sheet metal member.

16. The mirror attachment structure of claim 1, wherein the mirror is formed by evaporating aluminum onto said portion of the reinforcement sheet metal member.

17. A mirror attachment structure for an image-reading apparatus that includes a light source for illuminating a document and a photoelectric conversion device for receiving light from the light source reflected from the document that are mounted in the image-reading apparatus for movement together relative to the document in order to scan the document, the mirror attachment structure comprising:
- a carriage that is elongated in a first direction for supporting the light source and the photoelectric conversion device;
- a reinforcement sheet metal member that is secured to a portion of the carriane, that is elongated in said first direction, and that extends over most of the length of the carriage in said first direction; and
- a mirror that is formed on a portion of the reinforcement sheet metal member, with the reinforcement sheet metal member being between the mirror and the portion of the carriage that supports the reinforcement sheet metal member; wherein
- the reinforcement sheet metal member is secured to a portion of the carriage to increase the rigidity of the carriage;
- the mirror is elongated in said first direction and extends over most of the length of the reinforcement sheet metal member and most of the length of the carriaae in said first direction; and
- the carriage is designed to support the light source, the photoelectric conversion device, and the mirror so that light from the light source that is reflected from the document and then from said mirror is reflected generally toward the photoelectric conversion device.

18. The mirror attachment structure of claim 17, wherein the mirror is formed by evaporating aluminum onto said portion of the reinforcement sheet metal member.

19. The mirror attachment structure of claim 15, wherein the reinforcement sheet metal member is a triangular rod, and the mirror is formed on a surface of the, triangular rod.

20. A mirror attachment structure for an image-reading apparatus that includes a light source for illuminating a document and a photoelectric conversion device for receiving light from the light source reflected from the document that are mounted in the image-reading apparatus for movement together relative to the document in order to scan the document, the mirror attachment structure comprising:
- a carriage that is elongated in a first direction for supporting the light source and the photoelectric conversion device;

a reinforcement sheet metal member that is secured to a portion of the carriage, that is elongated in said first direction, and that extends over most of the length of the carriage in said first direction; and a mirror that is formed on a portion of the reinforcement sheet metal member, with the reinforcement sheet metal member being between the mirror and the portion of the carriaae that supports the reinforcement sheet metal member; wherein the reinforcement sheet metal member is secured to a portion of the carriage to increase the rigidity of the carriage;

the mirror is elongated in said first direction and extends over most of the length of the reinforcement sheet metal member and most of the length of the carnage in said first direction;

the reinforcement sheet metal member and the mirror occupy recesses in the carriage; and the carriage is designed to support the light source, the photoelectric conversion device, and the mirror so that light from the light source that is reflected from the document and then from said mirror is reflected generally toward the photoelectric conversion device.

21. The mirror attachment structure of claim 20, wherein the mirror is formed by evaporating aluminum onto said portion of the reinforcement sheet metal member.

22. The mirror attachment structure of claim 20, wherein the reinforcement sheet metal member is a triangular rod, and the mirror is formed on a surface of the triangular rod.

* * * * *